United States Patent
Owens et al.

(10) Patent No.: US 11,409,889 B2
(45) Date of Patent: Aug. 9, 2022

(54) METHOD AND SYSTEM FOR ENCRYPTED SEARCHING

(71) Applicant: YAHOO ASSETS LLC, Dulles, VA (US)

(72) Inventors: Stephen Owens, Marietta, GA (US); Sonia Johnson, Los Altos, CA (US); Ramu Adapala, Cupertino, CA (US); Chris Elza Kurian, Sunnyvale, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 445 days.

(21) Appl. No.: 16/513,320

(22) Filed: Jul. 16, 2019

(65) Prior Publication Data

US 2021/0019426 A1    Jan. 21, 2021

(51) Int. Cl.

| | | |
|---|---|---|
| *G06F 21/60* | (2013.01) | |
| *G06F 16/953* | (2019.01) | |
| *H04L 9/14* | (2006.01) | |
| *H04L 9/08* | (2006.01) | |
| *G06F 16/955* | (2019.01) | |

(52) U.S. Cl.
CPC .......... *G06F 21/602* (2013.01); *G06F 16/953* (2019.01); *G06F 16/9566* (2019.01); *H04L 9/0861* (2013.01); *H04L 9/14* (2013.01)

(58) Field of Classification Search
CPC .. G06F 21/602; G06F 16/953; G06F 16/9566; H04L 9/0861; H04L 9/14; H04L 9/088
See application file for complete search history.

(56) References Cited

U.S. PATENT DOCUMENTS

| | | | |
|---|---|---|---|
| 2009/0300351 A1 * | 12/2009 | Lei ...................... | G06F 16/951 713/165 |
| 2011/0040753 A1 | 2/2011 | Knight | |
| 2012/0005182 A1 * | 1/2012 | Monteverde ........ | G06F 16/9535 707/706 |
| 2014/0244629 A1 * | 8/2014 | Huang .................. | G06F 16/248 707/723 |
| 2019/0073429 A1 * | 3/2019 | Osann, Jr. ........... | G06F 16/9535 |
| 2019/0243519 A1 * | 8/2019 | Nelson .................. | G06F 3/0482 |

OTHER PUBLICATIONS

Office Action dated Oct. 6, 2021 in U.S. Appl. No. 16/513,372.
Notice of Allowance dated Feb. 11, 2022 in U.S. Appl. No. 16/513,372.

* cited by examiner

*Primary Examiner* — Abiy Getachew
(74) *Attorney, Agent, or Firm* — Venable LLP

(57) ABSTRACT

The present teaching relates to a method, system, and programming for encrypted searching. In a search session, a uniform resource locator (URL) is received, wherein a portion of the URL is encrypted via a first key. A second key associated with the first key is obtained. A determination is made regarding whether a time-related criterion associated with the second key is satisfied. In response to the time-related criterion being satisfied, the portion of the URL is decrypted based on the second key to obtain a keyword, one or more search results are obtained based on the keyword, and a webpage including the one or more search results to be provided to a user is generated.

20 Claims, 11 Drawing Sheets

METHOD AND SYSTEM FOR ENCRYPTED SEARCHING

BACKGROUND

1. Technical Field

The present teaching generally relates to data processing. Specifically, the present teaching relates to a privacy based search engine that provides an extra level of privacy and convenience for users.

2. Technical Background

The Internet has made it possible for a person to electronically access virtually any content at any time and from any location. The Internet technology facilitates information publishing, information sharing, and data exchange in various spaces and among different persons. Typically, users issue a search query to a search engine to obtain desirable content. A search engine is one type of information retrieval system that is designed to help users search for and obtain access to information that is stored in a computer system or across a network of computers. In response to a query from a user, the search engine can search different content providers online to obtain search results matching the query. Content providers can be a publisher, a content portal, or any other sources from which content can be obtained.

A growing level of concern among users of search engines is that of privacy. Specifically, users are concerned about information related to their search sessions being accessible by other users, as well as, whether the search engines are continuously tracking user activities. Existing technologies to address these issues provide for encrypted based search approaches. However, such approaches have certain drawbacks. For instance, in the existing encryption based search methods, information regarding encryption is typically stored in cookies. Thus, the encryption keys are only cleared when a browsing session is closed by the user i.e., the user closes a web browser. As such, if a user forgets to close the browser, the search history is not cleared and is accessible to other users.

Accordingly, there is a requirement for a privacy based search engine which provides a cookie-less experience. Specifically, there is a requirement for privacy based search, wherein a server generates and controls expiration times of encryption/decryption keys (as opposed to storing the keys in cookies), and moreover provides for sharing of information (e.g., uniform resource locators) in time-periods that are controlled by the server.

SUMMARY

The teachings disclosed herein relate to methods, systems, and programming for data processing. Specifically, the present teaching relates to a privacy based search engine that provides an extra level of privacy and convenience for users.

One aspect of the present disclosure provides for a method, implemented on a machine having at least one processor, storage, and a communication platform capable of connecting to a network for encrypted searching. The method includes the steps of receiving, in a search session, a uniform resource locator (URL), wherein a portion of the URL is encrypted via a first key; obtaining a second key associated with the first key; determining whether a time-related criterion associated with the second key is satisfied; and in response to the time-related criterion being satisfied, decrypting the portion of the URL based on the second key to obtain a keyword, obtaining one or more search results based on the keyword, and generating a webpage including the one or more search results to be provided to a user.

By one aspect of the present disclosure, there is provided a system for encrypted searching. The system includes: an extraction unit implemented by a processor and configured to receive, in a search session, a uniform resource locator (URL), wherein a portion of the URL is encrypted via a first key; a decryption unit implemented by the processor and configured to: obtain a second key associated with the first key, determine whether a time-related criterion associated with the second key is satisfied, and decrypt, in response to the time-related criterion being satisfied, the portion of the URL based on the second key to obtain a keyword; a content retrieving unit implemented by the processor and configured to obtain, in response to the time-related criterion being satisfied, one or more search results based on the keyword; and a result rendering unit implemented by the processor and configured to generate a webpage including the one or more search results to be provided to a user.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, there is provided, a machine readable and non-transitory medium having information recorded thereon for encrypted searching, wherein the information, when read by the machine, causes the machine to perform: receiving, in a search session, a uniform resource locator (URL), wherein a portion of the URL is encrypted via a first key; obtaining a second key associated with the first key; determining whether a time-related criterion associated with the second key is satisfied; and in response to the time-related criterion being satisfied, decrypting the portion of the URL based on the second key to obtain a keyword, obtaining one or more search results based on the keyword, and generating a webpage including the one or more search results to be provided to a user.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
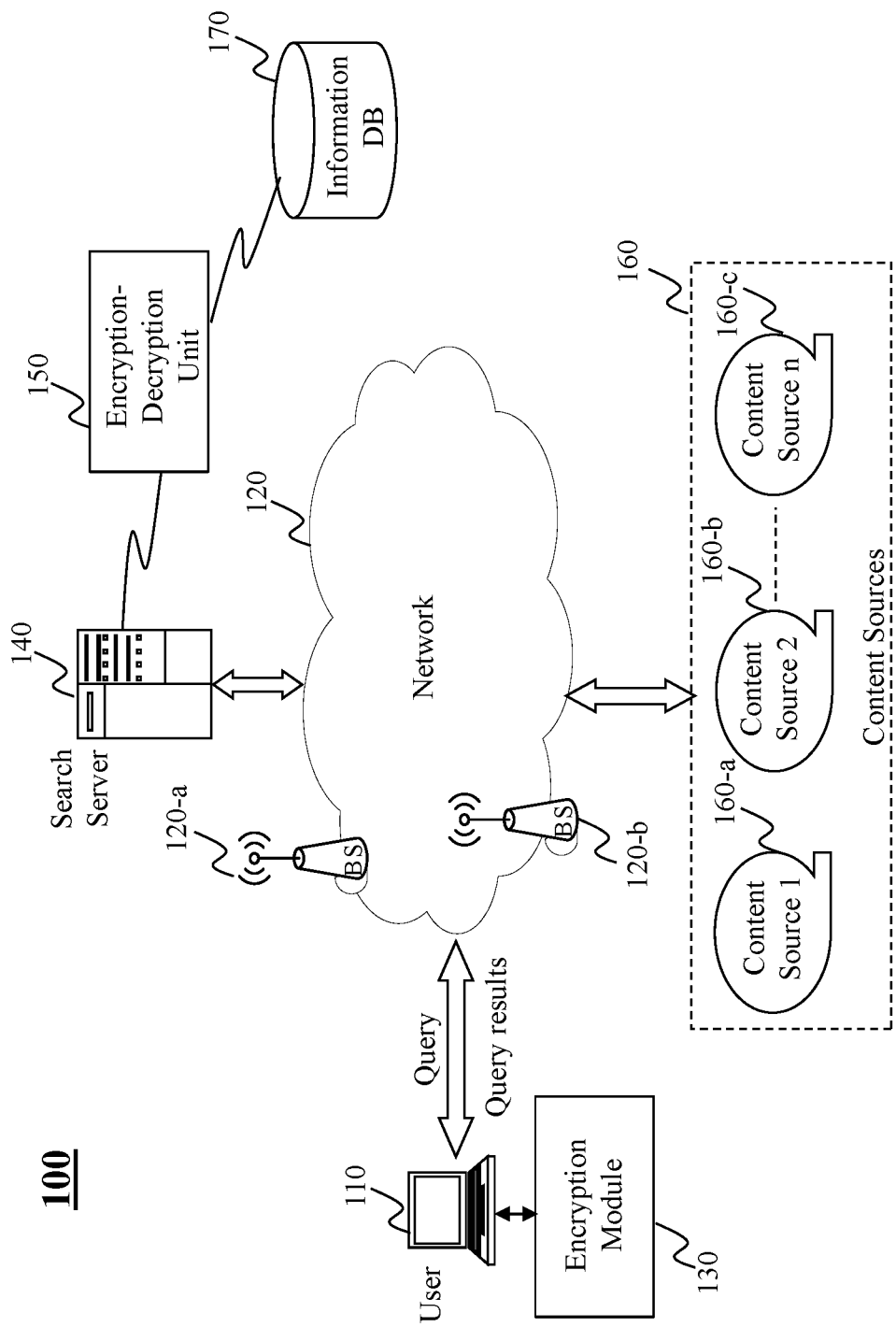
FIG. 1 illustrates an exemplary system configuration in which an encryption-decryption unit can be deployed, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein. Example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

FIG. 1 illustrates an exemplary system configuration in which an encryption decryption unit 150 can be deployed in accordance with various embodiments of the present teaching. In the configuration 100 depicted in FIG. 1, the encryption-decryption unit 150 is connected to a search server 140 as its backend service engine. That is, in this embodiment, the encryption-decryption unit 150 is a special module in the backend of the search server 140. When there are multiple search servers (not shown), each may have its own backend module for search encryption-decryption purposes.

In FIG. 1, the exemplary system 100 includes a user 110, an encryption module 130, a network 120, the search server 140, the encryption-decryption unit 150, an information database 170, and one or more content providers 160, including content provider 1 160-a, content provider 2 160-b, . . . , content provider n 160-c.

The network 120 may be a single network or a combination of different networks. For example, a network may be a local area network (LAN), a wide area network (WAN), a public network, a private network, a proprietary network, a Public Telephone Switched Network (PSTN), the Internet, a wireless network, a cellular network, a virtual network, or any combination thereof. A network may also include various network access points, e.g., wired or wireless access points such as base stations or Internet exchange points 120-a, . . . , 120-b, through which a data source may connect to the network 120 in order to transmit information via the network and a network node may connect to the network 120 in order to receive information. In one embodiment, the network 120 may be a content distribution network, which connects users 110 to the search engine 130, which provides the users with relevant content obtained from the content providers 160.

User 110 may be of different types such as users connected to the network via desktop connections, users connecting to the network 120 via wireless connections such as through a laptop, a handheld device, or a built-in device in a mobile vehicle such as a motor vehicle. In one embodiment, user 110 may be connected to the network 120 and be able to access and interact with online content (provided by the content providers 160), via wired or wireless means, through related operating systems and/or interfaces implemented within user-wearable devices (e.g., glasses, wristwatch, etc.). A user may send a request or a search query for content to the search server 140 and receive content via the network 120.

Content providers 160, may correspond to an entity, whether an individual, a firm, or an organization, publishing or supplying content, including a blogger, television station, a newspaper issuer, a web page host, a content portal, an online service provider, or a game server. For example, in connection to an online or mobile ad network, content provider 160 may be an organization such as CNN.com, a content portal such as YouTube and Yahoo.com, or a content-soliciting/feeding source such as Twitter or blogs.

According to one embodiment of the present disclosure, the encryption-decryption unit 150 provides a level of privacy and convenience for user's search operations. The encryption module 130 may be a module that is embedded within a browser operating on the user's device 110. The encryption module 130 is configured to encrypt search terms entered by a user. Specifically, the encryption-decryption unit 150 maintains a plurality of sets of keys stored in the information database 170. Each set of keys includes a first key (e.g., a public key) and a corresponding second key (e.g., private key). The encryption-decryption unit 150 selects a set of keys to be an active set of keys. In other words, the encryption-decryption unit 150 sets an active time-period (also referred to herein as a time-window) for the selected set of keys. Upon expiration of the time-window for the selected set of keys, the encryption-decryption unit 150 selects another set of keys to be the new active set of keys having a corresponding new active time-period.

In operation, a request for search results i.e., a query issued by the user is encrypted via the first key and transmitted to the search server 140. For example, upon the user entering keyword(s) (for which search results are desired), the keyword(s) are incorporated into a uniform resource locator (URL). A portion of the URL including the keyword is encrypted by the encryption module 130. The encrypted URL is then transmitted to the search server 140.

Upon receiving an encrypted URL, the search server utilizes the encryption decryption unit 150 to process the received URL. Specifically, the encryption-decryption unit 150 retrieves (from the information database 170) the second key associated with the first key. By one embodiment, the encryption-decryption unit 150 can extract a parameter from the received URL to identify the first key that was used by the encryption module 130 to encrypt the keywords. Accordingly, based on the extracted parameter, the encryption-decryption unit 150 can identify the second key.

Further, the encryption-decryption unit 150 utilizes the second key to decrypt the portion of the URL that is encrypted and obtain the keyword(s) entered by the user. The obtained keyword(s) can be used by the search server to retrieve relevant search results that are to be provided to the user. As described later with reference to FIG. 5, some of the search results may be encrypted by the encryption-decryption unit 150 and transmitted to the user. In this manner, the search keywords entered by a user are encrypted and the encryption-decryption unit 150 decrypts the keywords for a short period of time i.e., the active time-window assigned to the active set of keys. It must be appreciated that during this period of time, search URLs in a user's history can be accessed or even shared with other users. Further, by one embodiment, a countdown timer (related to the active time-window) may be embedded in a search results page thereby indicating an amount of time that must elapse before the encryption key expires. Once the encryption-decryption unit 150 ceases using a given encryption key, the search terms fail to be decrypted, and the URLs (e.g., search request URL) may be redirected to a simple search box. In this manner, search history of a user auto-expires without the user manually clearing it.

Figure 2:
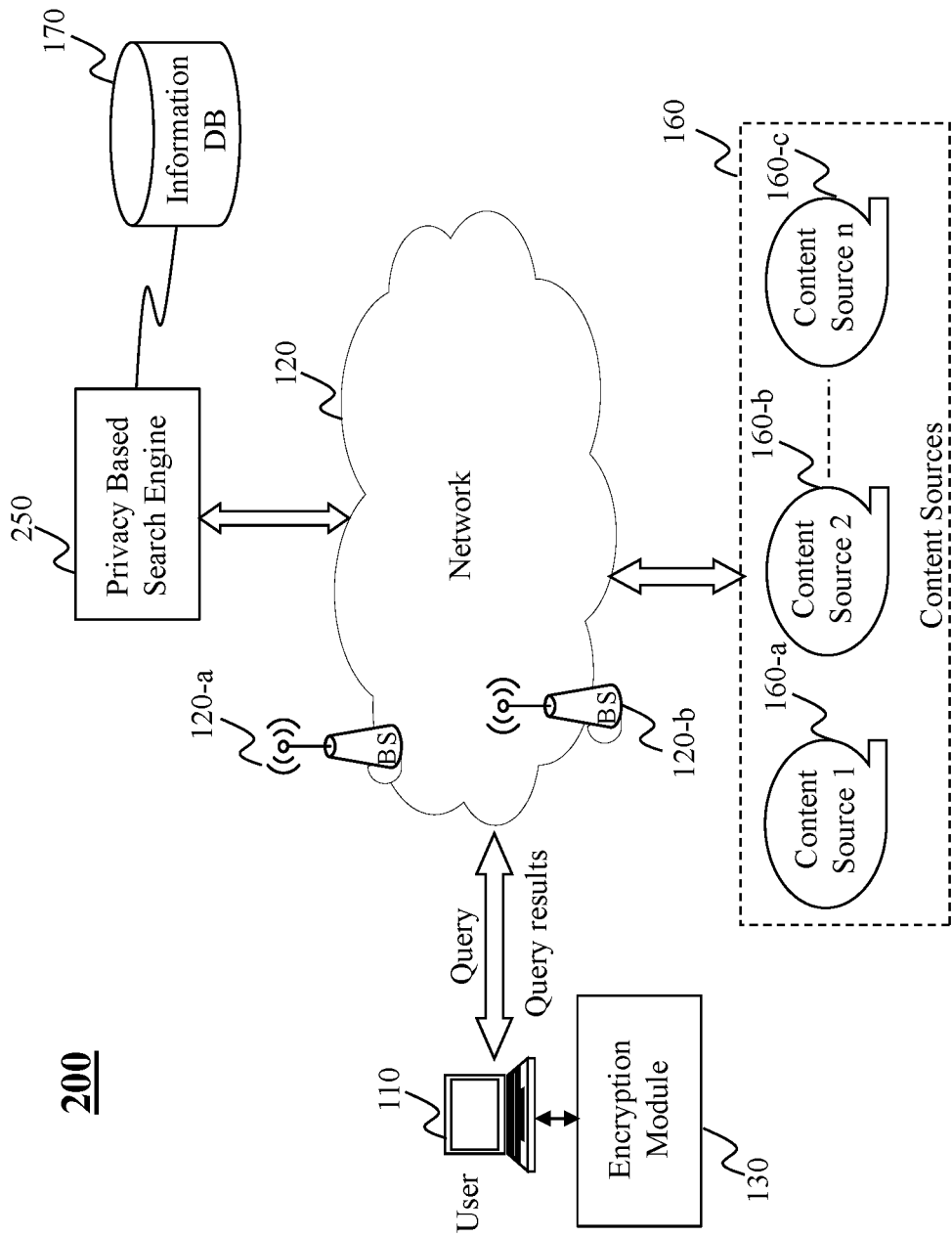
FIG. 2 illustrates another exemplary system configuration in which an encryption-decryption unit can be deployed, according to an embodiment of the present teaching.

As stated previously, the embodiment illustrated in FIG. 1 includes the encryption-decryption unit 150 as a backend engine of the search server 140. In FIG. 2, an alternate configuration is provided wherein the encryption-decryption unit 150 is included within the search server. As shown in FIG. 2, such a configuration is referred to herein as a privacy based search engine 250, which is a stand alone service on the network and performs functions similar to those described above with reference to FIG. 1.

Figure 3:
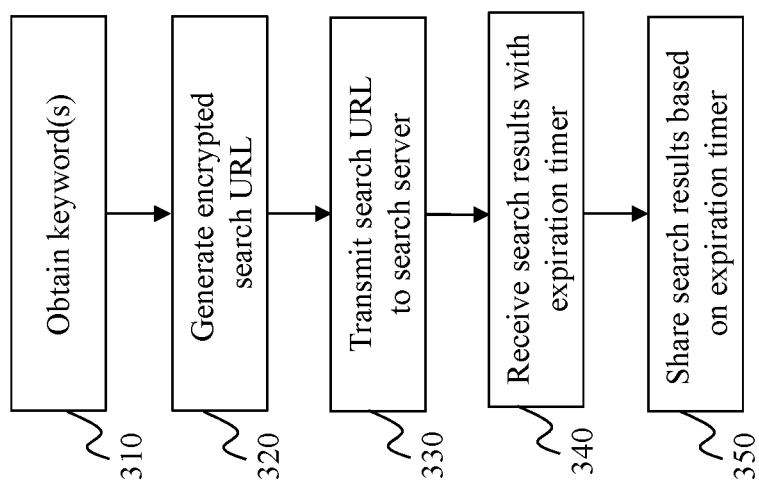
FIG. 3 is a high-level flowchart of an exemplary process performed by a client device according to some embodiments of the present teaching.

FIG. 3 is a flowchart of an exemplary process performed by a client device according to some embodiments of the present teaching. The process commences in step 310 wherein keyword(s) entered by a user in a browser (for which search results are desired) are obtained. In step 320, a query corresponding to the keyword(s) is generated. For instance, by one embodiment, a URL (referred to herein as a search URL) is generated wherein the keyword(s) are included in a portion of the URL. The portion of the URL is further encrypted e.g., via the encryption module as described with reference to FIGS. 1 and 2.

In step 330, the generated search URL is transmitted to a search server. Upon processing of the transmitted URL (by the search server), the client device in step 340 receives search results relevant to the keyword(s). By one embodiment, the search server may be configured to generate a webpage including the search results that are to be provided to the user. Additionally, the webpage may include timing information embedded therein. The timing information i.e., an expiration timer may correspond to an amount of time that must lapse before the encryption-decryption keys are refreshed by the server. Further in step 350, the obtained search results may be shared by the user with other users based on the expiration timer. Specifically, search results which are encrypted by the server may be accessed by other users as long as the request to access the search results (by other users) is within the active time-window of the set of keys used for encryption-decryption purposes of the search results.

Figure 4:
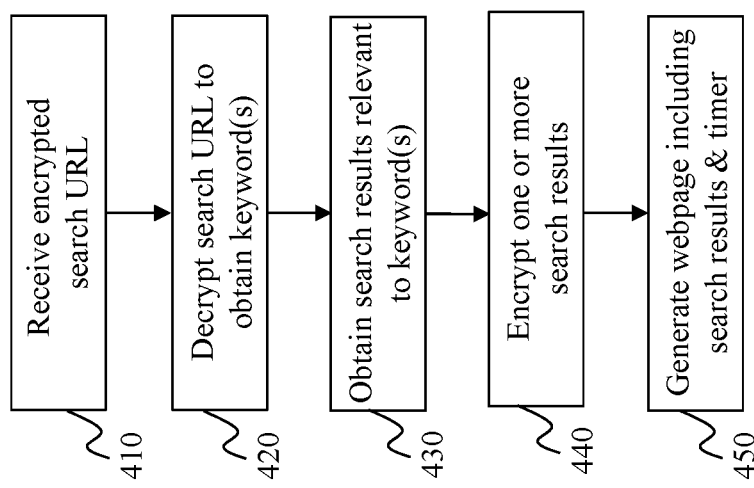
FIG. 4 is a high-level flowchart of an exemplary process performed by a search server according to some embodiments of the present teaching.

FIG. 4 is a high-level flowchart of an exemplary process performed by a search server according to an embodiment of the present teaching. In this embodiment, it is assumed that the search server possesses the functionalities of the encryption-decryption unit as shown in FIG. 2. The process commences in step 410, wherein the server receives an encrypted search URL (generated by a client device). It must be appreciated that the client device utilizes a first key (e.g., a public key, generated and transmitted by the server) to encrypt a portion of the search URL. In step 420, the server decrypts the portion of the received search URL based on a second key (e.g., a private key corresponding to the public (first) key)).

The process then proceeds to step 430, wherein the server obtains search results relevant to the keywords(s) entered by a user. In step 440, the server encrypts one or more of the obtained search results. Specifically, as will be described later with reference to FIG. 5, the server encrypts each search result that satisfies a criterion. Further, in step 450, the server generates a webpage i.e. a results page to be provided to the user. By one embodiment, the results page includes the search results as well an expiration timer embedded therein. As described previously, the expiration timer corresponds to an amount of time that must elapse before the current public/private encryption-decryption keys expire.

Figure 5:
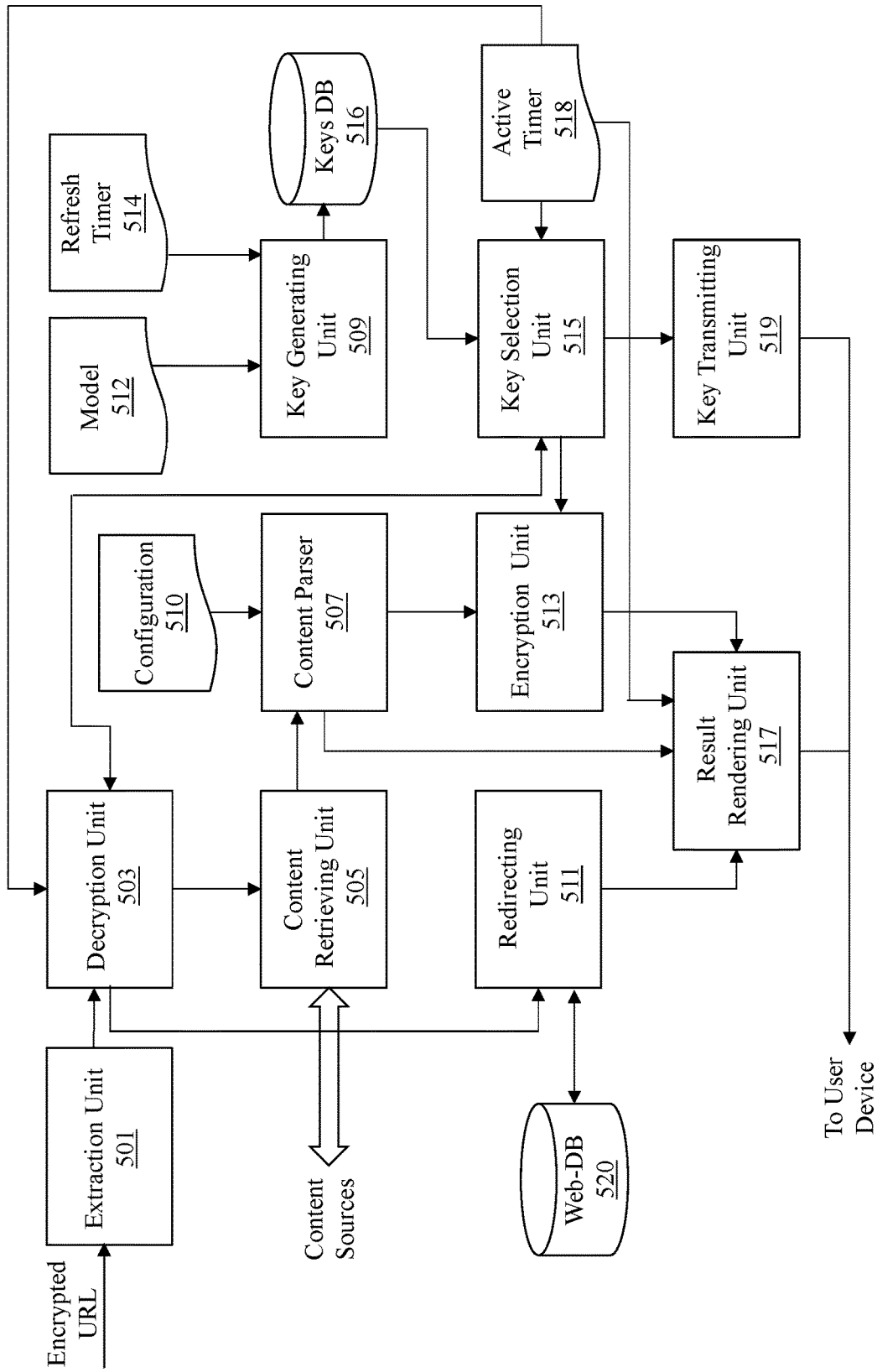
FIG. 5 depicts an exemplary high-level system diagram of an encryption-decryption unit included in a search server, according to some embodiments of the present teaching.

FIG. 5 depicts an exemplary high-level system diagram of an encryption-decryption unit included in a search server, according to some embodiments of the present teaching. The encryption-decryption unit 150 includes an extraction unit 501, a decryption unit 503, a content retrieving unit 505, a content parser 507, a key generating unit 509, a key selection unit 515, a redirecting unit 511, an encryption unit 513, a key transmitting unit 519 and a result rendering unit 517.

By one embodiment, the key generating unit 509 generates a plurality of sets of keys in accordance with a key generating model 512. Specifically, the key generating unit generates a plurality of set of keys, wherein each set includes a first key and a second key. By one embodiment, the first key corresponds to a public key and the second key corresponds to a private key. The generated plurality of sets of keys are stored in a key database 516. The key generating unit 509 is further configured to periodically refresh, in accordance with a refresh timer 514, the sets of keys. For example, the key generating unit may be configured to generate new sets of keys on a daily basis.

The key selection unit 515 is configured to select a set of keys (including the first key and the second key) from the plurality of sets of keys. The selected set of keys is deemed to be active for an amount of time (referred to herein as an active time-window/time-period) set in accordance with an active timer 518. For example, a set of keys may be set to be active for a time period of one hour. Thereafter, upon expiration of the active time-window, the key selection unit 515 selects a new set of keys to be active. The key transmitting unit 519 transmits the first key of the active set to the client device. It must be appreciated that the first key may be embedded in a web-browser operating on the client device and used to encrypt the keyword(s) entered by the user.

By one embodiment of the present disclosure, the extraction unit 501 receives the encrypted search URL (generated by the client device). The extraction unit 501 extracts a parameter included in the search URL. The parameter provides an indication as to which set of keys is currently active i.e., the first key used by the client device for encryption purposes. The decryption unit receives the extracted parameter and retrieves (via the selection unit) the second key corresponding to the first key. Note that the second key is a private key which is stored and accessed on by the encryption-decryption unit i.e., the second key is not shared with the client device. Further, the decryption unit 503 also verifies whether a current time instant i.e., a time of receiving the encrypted URL is within the active time-window of the currently active keys. In other words, the decryption unit verifies whether the second key is active at the time instant of receiving the encrypted URL.

By one embodiment, if a response to the verification is affirmative, then the decryption unit proceeds to decrypt (via the second key) the encrypted portion of the received URL. Upon decrypting the encrypted portion, the decryption unit obtains the keyword(s) and transmits the keyword(d) to the content retrieving unit 505. The content retrieving unit obtains search results relevant to the keyword(s) and transmits them to the content parser for further processing.

However, if the response to the verification is negative i.e., the current time instant of receiving the encrypted URL is outside the active time window (or in other words the keys have expired), the decryption unit fails to decrypt the URL. In this case, the decryption unit 503 triggers the redirecting unit 511 to redirect the received query to a search box. For example, the redirecting unit by one embodiment may direct the URL to a predetermined webpage (e.g., a search page) stored in the web database 520.

By one embodiment of the present disclosure, the content parser 507 obtains the search results from the content retrieving unit 505. The content parser 507 is configured to analyze each of the search results and determine whether the search result satisfies a criterion. For example, the content parser 507 is configured to analyze a search result URL in accordance with a configuration 510 and determine whether the search result URL includes keywords or special terms. If the search result URL satisfies the criterion, the content parser triggers the encryption unit 513, which encrypts the portion of the search result URL which includes the special terms/keywords. It must be appreciated that the encryption unit utilizes the first key of the active set of keys in performing the encryption. However, if the search result does not satisfy the criterion, the search result is directly transmitted to the results rendering unit 517.

The results rendering unit 517 receives the encrypted search results as well as the un-encrypted search results from the content parser 507 and the encryption unit 513, respectively. Further, the results rendering unit 517 also receives information pertaining to the active time window of the set of keys that is currently active. By one embodiment, the results rendering unit 517 may be configured to generate a search results page that is to be provided in response to the query received from the user. The search results page includes the search results as well as timing information of the active time window.

In this manner, the query i.e. search URL well as the encrypted search results URLs can be refreshed in the user's browser or even shared with a user on another computer. Once the active time window (associated with the keys used for encryption/decryption of the URLs) has been surpassed i.e., the keys have expired, the search terms (keyword(s)) will fail to be decrypted, and the URL will be redirected to a simple search box. In this way, even if a user fails to clear their search history, the search history itself will be unreadable after a period of time corresponding to the active time window.

Figure 6A:
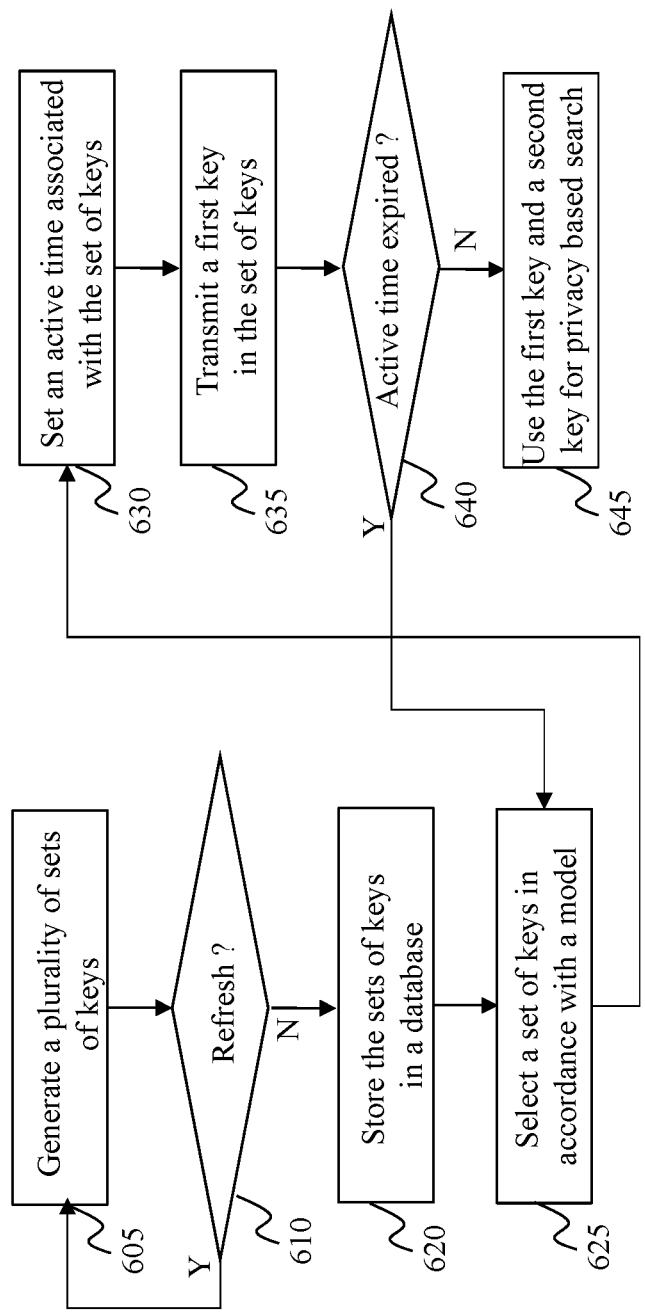
FIG. 6A is a high-level flowchart of an exemplary process performed by a key generating unit according to some embodiments of the present teaching.

Turning now to FIG. 6, there is provided a high-level flowchart of an exemplary process performed by a key generating unit according to some embodiments of the present teaching. The process commences in step 605, wherein the key generating unit generates a plurality of sets of keys in accordance with a key generation model. Each set of keys includes a first key and a second key.

In step 610, the key generating unit performs a query to determine whether the generated sets of keys are to be refreshed i.e., new sets of keys are to be generated. If the response to the query is affirmative the process loops back to step 605 to generate the plurality of sets of keys. If the response to the query is negative, the process moves to step 620. Note that the key generating unit may be configured to refresh the sets of keys in accordance with time-schedule e.g., daily, weekly etc.

The process then moves to step 620 wherein the generates sets of keys are stored in a key database. In step 625, a set of keys from the generated sets of keys is selected in accordance with a model. For example, a set of keys may be randomly selected from the plurality of sets of keys. Further, the process in step 630 sets an active time-window for the selected set of keys. In step 635, a first key included in the active set of keys is transmitted to a client device(s). As stated previously, it is the first key that is used by the client devices to encrypt search terms included in the queries e.g., search URLs.

In step 640, a query is performed to determine whether the active time window associated with the active set of keys is expired. If the response to the query is affirmative, the process moves to step 625 to select a new active set of keys. However, if the response to the query is negative, the process moves to step 645, wherein the first and second keys of the active set of keys is used for performing privacy based search as described above.

Figure 6B:
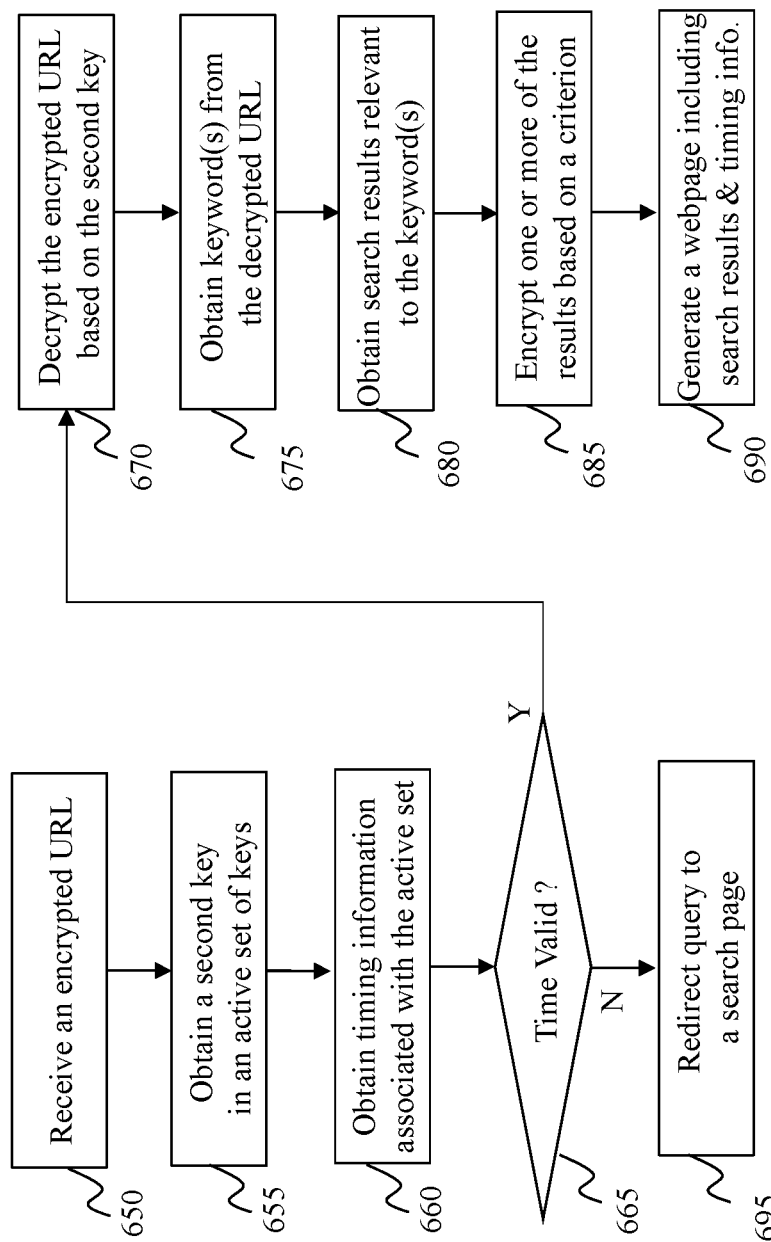
FIG. 6B is a high-level flowchart of an exemplary process performed by an encryption-decryption unit according to some embodiments of the present teaching.

FIG. 6B is a high-level flowchart of an exemplary process performed by an encryption-decryption unit according to some embodiments of the present teaching. The process commences in step 650 wherein an encrypted URL is received from a client device. In step 655, a second key of an active set of keys is obtained based on a parameter extracted from the received URL. The process then moves to step 660 to obtain timing information associated with the active set of keys. For example, an active time-window associated with the set of active keys is obtained.

In step 665, the encryption-decryption unit performs a query to determine whether a time of receiving the encrypted URL is within the active time-window. If the response to the query is affirmative, the process moves to step 670, else the process moves to step 695. The process in step 695 redirects the query to a search box. In contrast, in step 670, the encrypted URL is decrypted based on a second key of the active set of keys. Upon decryption, the keyword(s) included in the encrypted URL are obtained in step 675.

The process then moves to step 680 wherein search results relevant to the extracted keyword(s) are obtained. In step 685, the encryption-decryption unit analyses each of the search results to determine whether the search result satisfies a criterion. For example, as described previously, if a search result URL includes a special term or keyword, then the encryption-decryption unit encrypts the portion of the search result URL which includes the keyword. It must be appreciated that the encryption is performed via the first key of the active set of keys.

Further, in step 690, the encryption-decryption unit generates a search results page which is to be rendered to the user in response to the query. The search results page includes the obtained search results (some of which may be encrypted) and may in some instances also include timing information embedded in the search results page. Note that the timing information corresponds to an amount of time that must lapse before the current set of active keys expires.

Figure 7:
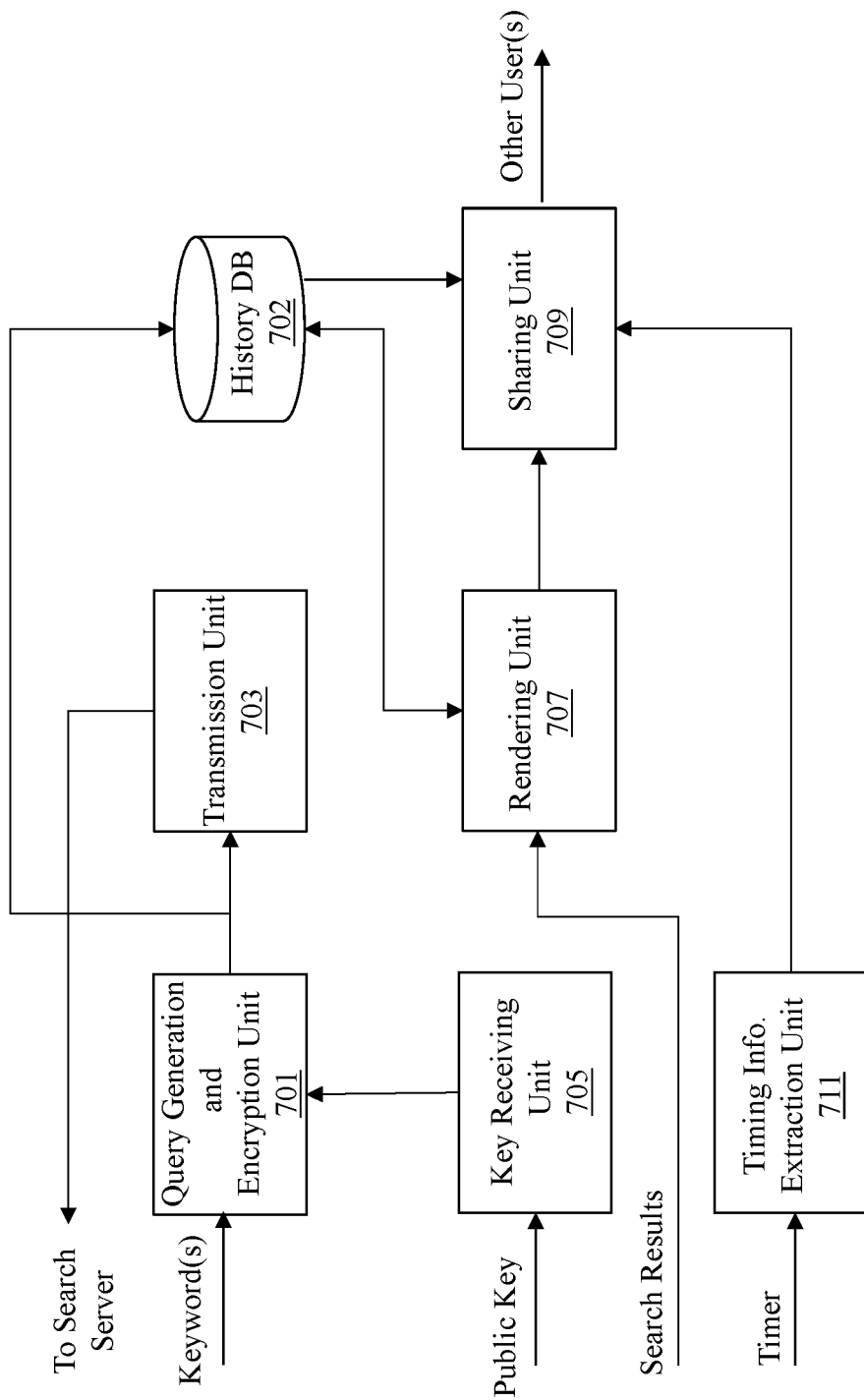
FIG. 7 depicts an exemplary high-level system diagram of a client device, according to some embodiments of the present teaching.

FIG. 7 depicts an exemplary high-level system diagram of a client device, according to some embodiments of the present teaching. The client device includes a query generation and encryption unit 701, a transmission unit 703, a key receiving unit 705, a rendering unit 707, a sharing unit 709, and a timing information extraction unit 711.

The query generation and encryption unit 701 receives keyword(s) entered by a user of the client device. By one embodiment, the user may enter the keyword(s) (for which relevant search results are desired) in a web browser operating on the client device. Upon receiving the keyword(s), the query generation and encryption unit 701 generates a request that is to be transmitted to a search server. By one embodiment, the query generation and encryption unit 701 generates a URL (i.e., search URL) having the keyword(s) included in a portion of the URL. The portion of the URL including the keyword(s) are encrypted via a public key. The query generation and encryption unit 701 obtains the public key from the key receiving unit 705. By one embodiment, the public key transmitted by the search server (including the encryption-decryption unit) is received at the client device by the key receiving unit 705.

Upon generating the encrypted URL, the client device transmits the encrypted URL (i.e., the request) to the search server via the transmitting unit 703. It must be appreciated that the search URL may also be stored in a client browsing history database 702. The rendering unit 707 is configured to receive the search results relevant to the keyword(s) obtained by the search server. By one embodiment, the rendering unit 707 may also be configured to render the search results page (including the search results) to the user. It must be appreciated that a search result that is provided to the user may also be stored in the browsing history database 702 upon user interaction with the search result.

As stated previously, it must be appreciated that the client device obtains search results from the search server based on a time-related criterion associated with the encryption-decryption keys being satisfied. Specifically, by one embodiment, the time related criterion is associated with a second key (related to the first key), which is used for decryption purposes by the search server. For example, the time related criterion corresponds to the second key being valid (i.e., active) at a time instant when the search server receives the encrypted URL. In other words, the time related criterion corresponds to the search server receiving the encrypted URL within an active time-window of the second key.

By one embodiment of the present disclosure, the search results may be included in webpage, which also includes timing information. Specifically, the timing information corresponds to a countdown timer indicating an amount of time that must elapse before the encryption key expires. By one embodiment, the timing information extraction unit 711 retrieves this timing information and transmits it to the sharing unit 709. The sharing unit is configured to share the search results, the search URL, etc., with other users based on the timing information. Note that as stated previously, upon expiration of the active time-window associated with the active set of keys, the search terms fail to be decrypted, and the URLs (e.g., search request URL) may be redirected to a simple search box. In this manner, search history of the user auto-expires without the user manually clearing it.

Figure 8:
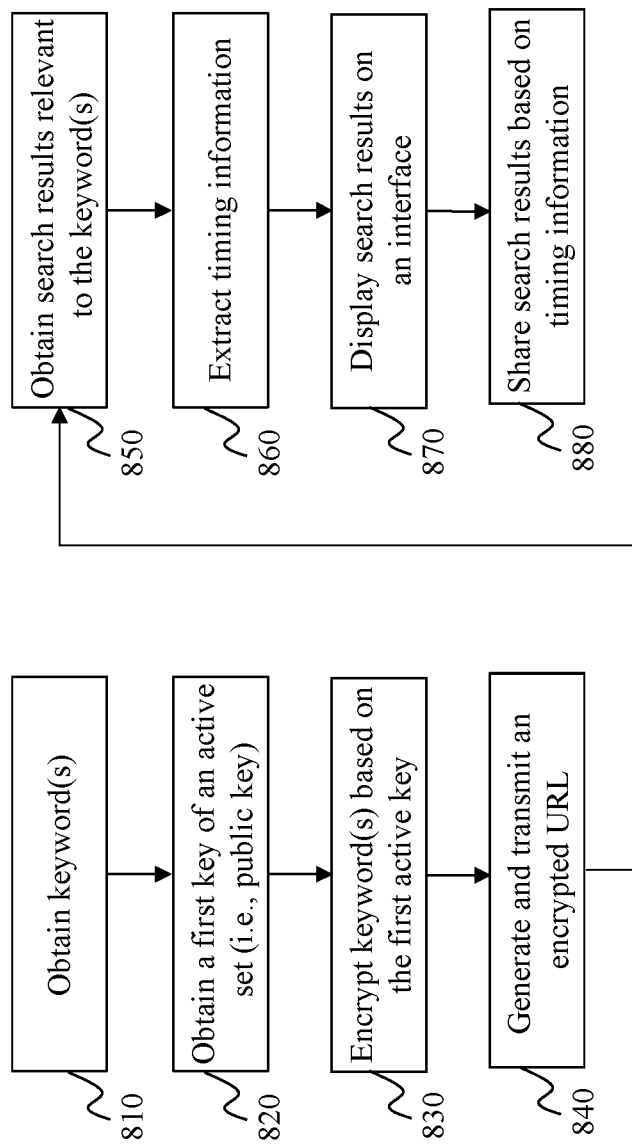
FIG. 8 is a flowchart of an exemplary process performed by a client device according to some embodiments of the present teaching.

FIG. 8 is a flowchart of an exemplary process performed by a client device according to some embodiments of the present teaching. The process commences in step 810 wherein keyword(s) entered by a user are obtained. In step 820, a first key (e.g. public key) of an active set of keys is obtained in order to encrypt the keyword(s). In step 840 a URL (i.e., a search URL) is generated and transmitted to a search server. Note that the generated URL includes a portion (corresponding to the keyword(s)) that is encrypted via the first key.

Upon transmitting the URL to the search server, in step 850, the client device receives search results relevant to the keyword(s). As described previously, the search results may be included in a webpage that is provided to the user. Moreover, the webpage may include timing information embedded therein. The timing information corresponds to an amount of time a current set of keys is active. The process then moves to step 870, wherein search results are provided to the user e.g., via an interface. In step 880, the user may optionally share the search results, search URL etc., with other users. It must be appreciated that the sharing (as well as accessing of the search results) by the user or other users is permitted only within the active time window of the active set of keys.

Figure 9:
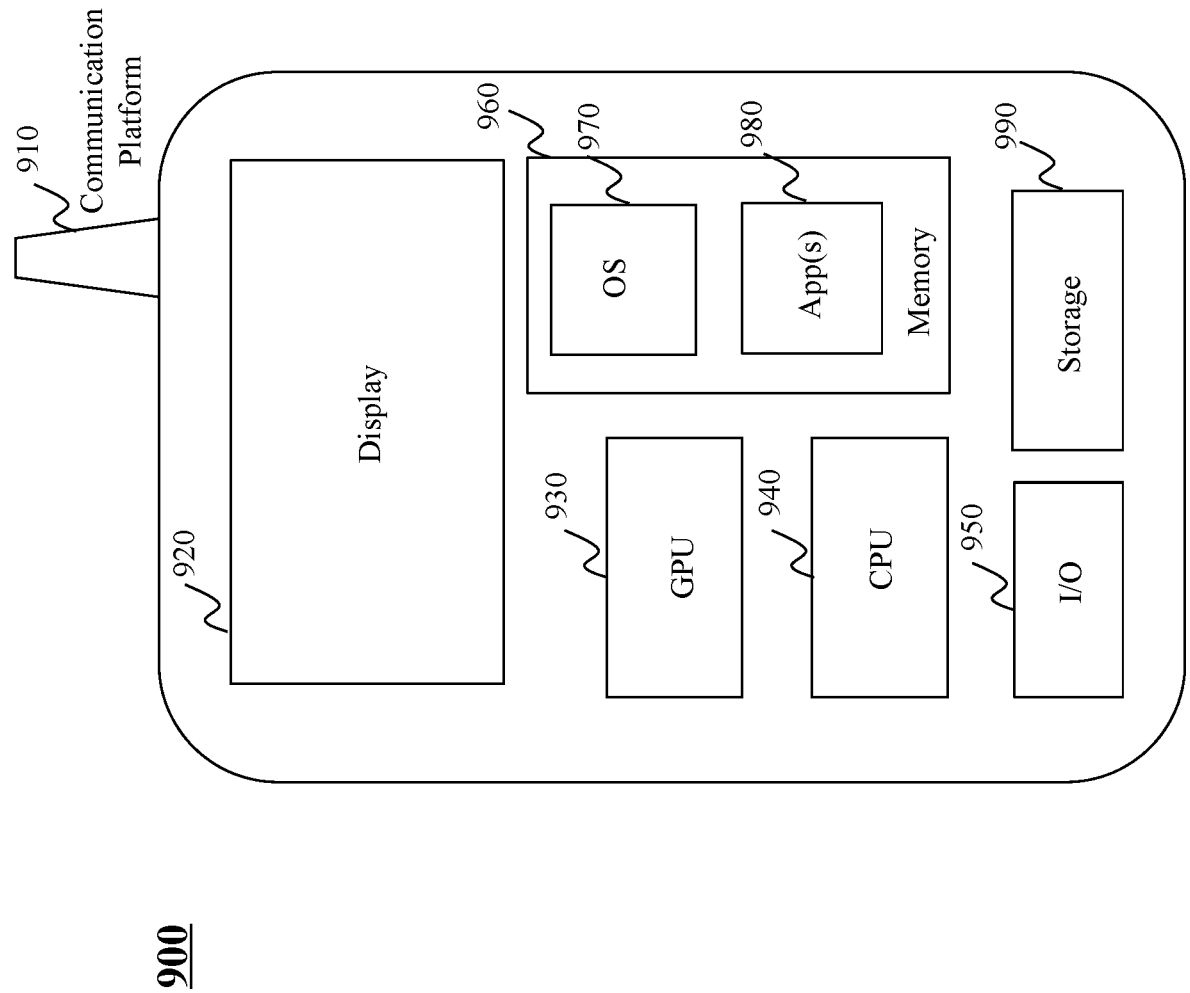
FIG. 9 depicts an architecture of a mobile device which can be used to implement a specialized system incorporating the present teaching.

Turning now to FIG. 9, there is depicted an architecture of a mobile device 900, which can be used to realize a specialized system implementing the present teaching. In this example, a user device on which the functionalities of the various embodiments described herein can be implemented is a mobile device 900, including, but not limited to, a smart phone, a tablet, a music player, a handled gaming console, a global positioning system (GPS) receiver, and a wearable computing device (e.g., eyeglasses, wrist watch, etc.), or in any other form factor.

The mobile device 900 in this example includes one or more central processing units (CPUs) 940, one or more graphic processing units (GPUs) 930, a display 920, a memory 960, a communication platform 910, such as a wireless communication module, storage 990, and one or more input/output (I/O) devices 950. Any other suitable component, including but not limited to a system bus or a controller (not shown), may also be included in the mobile device 900. As shown in FIG. 9, a mobile operating system 970, e.g., iOS, Android, Windows Phone, etc., and one or more applications 980 may be loaded into the memory 960 from the storage 990 in order to be executed by the CPU 940. The applications 980 may include a browser or any other suitable mobile apps for performing the various functionalities on the mobile device 900. User interactions with the content displayed on the display panel 920 may be achieved via the I/O devices 950.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 10:
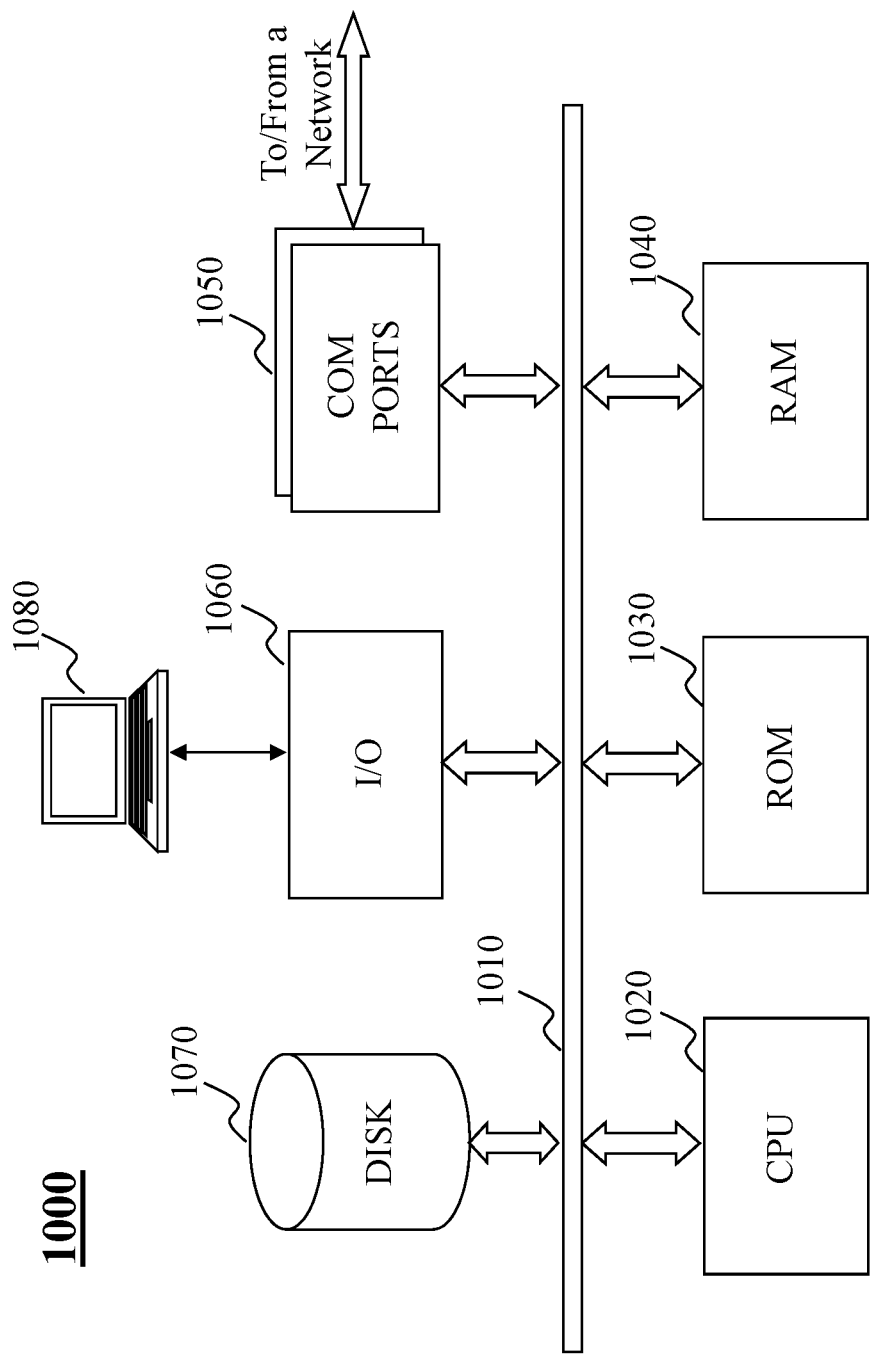
FIG. 10 depicts the architecture of a computer which can be used to implement a specialized system incorporating the present teaching.

FIG. 10 is an illustrative diagram of an exemplary computer system architecture, in accordance with various embodiments of the present teaching. Such a specialized system incorporating the present teaching has a functional block diagram illustration of a hardware platform which includes user interface elements. Computer 1000 may be a general-purpose computer or a special purpose computer. Both can be used to implement a specialized system for the present teaching. Computer 1000 may be used to implement any component(s) described herein. For example, the present teaching may be implemented on a computer such as computer 1000 via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 1000, for example, may include communication ports 1050 connected to and from a network connected thereto to facilitate data communications. Computer 1000 also includes a central processing unit (CPU) 1020, in the form of one or more processors, for executing program instructions. The exemplary computer platform may also include an internal communication bus 1010, program storage and data storage of different forms (e.g., disk 1070, read only memory (ROM) 1030, or random access memory (RAM) 1040), for various data files to be processed and/or communicated by computer 1000, as well as possibly program instructions to be executed by CPU 1020. Computer 1000 may also include an I/O component 1060 supporting input/output flows between the computer and other components therein such as user interface elements 1080. Computer 1000 may also receive programming and data via network communications.

Hence, aspects of the present teaching(s) as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the encryption-decryption unit into the hardware platform(s) of a computing environment or other system implementing a computing environment or similar functionalities in connection with encrypted searching. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the encryption-decryption unit as disclosed herein, may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform capable of connecting to a network for encrypted searching, the method comprising:
   receiving, by a search engine from a user device associated with a user, in a search session, a uniform resource locator (URL) including a keyword provided by the user, wherein a portion of the URL corresponding to the keyword is encrypted via a first key;
   obtaining a second key associated with the first key;
   determining whether a time-related criterion associated with the second key is satisfied; and
   in response to the time-related criterion being satisfied,
      decrypting, by the search engine, the encrypted portion of the URL based on the second key to obtain the keyword,
      obtaining one or more search results based on the keyword, and
      generating a webpage including the one or more search results to be provided to a the user.

2. The method of claim 1, wherein the method further comprises:
   in response to the time-related criterion being violated, directing the URL to a search box.

3. The method of claim 1, wherein the time-related criterion associated with the second key corresponds to a time instant of receiving the URL being within an active time-window.

4. The method of claim 1, wherein the step of obtaining a second key further comprises:
   extracting a parameter from the URL; and
   determining the second key based on the extracted parameter.

5. The method of claim 1, wherein the step of obtaining one or more search results further comprises:
   analyzing each of the one or more search results to determine whether the search result satisfies a criterion; and
   in response to the search result satisfying the criterion, encrypting the search result via the first key.

6. The method of claim 1, further comprising:
   generating a plurality of sets of keys in accordance with a model;
   selecting a set of keys from the plurality of sets of keys;
   setting an active time-window for the selected set of keys; and
   repeating the generating, the selecting, and the setting in accordance with a time-schedule.

7. The method of claim 6, further comprising:
   selecting, upon expiration of the active time-window, another set of keys.

8. A machine readable and non-transitory medium having information recorded thereon for encrypted searching, wherein the information, when read by the machine, causes the machine to perform:
   receiving, by a search engine from a user device associated with a user, in a search session, a uniform resource locator (URL) including a keyword provided by the user, wherein a portion of the URL corresponding to the keyword is encrypted via a first key;
   obtaining a second key associated with the first key;
   determining whether a time-related criterion associated with the second key is satisfied; and
   in response to the time-related criterion being satisfied,
      decrypting, by the search engine, the encrypted portion of the URL based on the second key to obtain the keyword,
      obtaining one or more search results based on the keyword, and
      generating a webpage including the one or more search results to be provided to the user.

9. The medium of claim 8, wherein the method further comprises:
   in response to the time-related criterion being violated, directing the URL to a search box.

10. The medium of claim 8, wherein the time-related criterion associated with the second key corresponds to a time instant of receiving the URL being within an active time-window.

11. The medium of claim 8, wherein the step of obtaining a second key further comprises:
   extracting a parameter from the URL; and
   determining the second key based on the extracted parameter.

12. The medium of claim 8, wherein the step of obtaining one or more search results further comprises:
   analyzing each of the one or more search results to determine whether the search result satisfies a criterion; and
   in response to the search result satisfying the criterion, encrypting the search result via the first key.

13. The medium of claim 8, further comprising:
   generating a plurality of sets of keys in accordance with a model;
   selecting a set of keys from the plurality of sets of keys;
   setting an active time-window for the selected set of keys; and
   repeating the generating, the selecting, and the setting in accordance with a time-schedule.

14. The medium of claim 13, further comprising:
   selecting, upon expiration of the active time-window, another set of keys.

15. A system for encrypted searching comprising:
   an extraction unit of a search engine implemented by a processor and configured to receive, from a user device associated with a user, in a search session, a uniform resource locator (URL) including a keyword provided by the user, wherein a portion of the URL corresponding to the keyword is encrypted via a first key;
   a decryption unit of the search engine implemented by the processor and configured to
      obtain a second key associated with the first key,
      determine whether a time-related criterion associated with the second key is satisfied, and decrypt, in response to the time-related criterion being satisfied, the encrypted portion of the URL based on the second key to obtain the keyword;

a content retrieving unit of the search engine implemented by the processor and configured to obtain, in response to the time-related criterion being satisfied, one or more search results based on the keyword; and a result rendering unit of the search engine implemented by the processor and configured to generate a webpage including the one or more search results to be provided to the user.

16. The system of claim 15, further comprising:

a redirecting unit implemented by the processor and configured to direct, in response to the time-related criterion being violated, the URL to a search box.

17. The system of claim 15, wherein the time-related criterion associated with the second key corresponds to a time instant of receiving the URL being within an active time-window.

18. The system of claim 15, wherein the extraction unit is further configured to:

extract a parameter from the URL; and determine the second key based on the extracted parameter.

19. The system of claim 15, further comprising:

a content parser implemented by the processor and configured to analyze each of the one or more search results to determine whether the search result satisfies a criterion; and an encryption unit implemented by the processor and configured to encrypt, in response to the search result satisfying the criterion, the search result via the first key.

20. The system of claim 15, further comprising:

a key generation unit implemented by the processor and configured to generate a plurality of sets of keys in accordance with a model; and a key selection unit implemented by the processor and configured to select a set of keys from the plurality of sets of keys, and set an active time-window for the selected set of keys, wherein the system is further configured to repeat the generating, the selecting, and the setting in accordance with a time-schedule.

* * * * *